United States Patent [19]

Vogelsberg

[11] Patent Number: 4,519,027
[45] Date of Patent: May 21, 1985

[54] INDUSTRIAL CONTROL, COMMUNICATIONS AND INFORMATION SYSTEM

[75] Inventor: Walter Vogelsberg, Doylestown, Pa.

[73] Assignee: Cybersonic Corporation, Montgomery, Pa.

[21] Appl. No.: 387,578

[22] Filed: Jun. 10, 1982

[51] Int. Cl.³ .................... G06F 15/46; G08B 25/02
[52] U.S. Cl. ................................ 364/185; 340/692; 340/870.09; 364/513.5; 381/51
[58] Field of Search ............... 364/138, 139, 184, 185, 364/513, 513.5; 381/51-53; 340/870.09, 870.16, 517-525, 692, 825.06, 825.16, 825.17, 825.22, 825.24, 825.25, 825.36, 328, 329, 384 R, 384 E; 360/12; 371/29

[56] References Cited

U.S. PATENT DOCUMENTS

| | | | |
|---|---|---|---|
| 3,538,264 | 11/1970 | Van Dyke | 340/692 X |
| 4,335,379 | 6/1982 | Martin | 340/692 X |
| 4,375,329 | 3/1983 | Park | 381/51 X |
| 4,387,368 | 6/1983 | Day et al. | 340/870.09 X |
| 4,401,971 | 8/1983 | Saito et al. | 340/692 X |

OTHER PUBLICATIONS

Keefe et al.—"Enhancement of a Radiation Safety System Through the Use of a Microprocessor Controlled Speech Synthesizer"—IEEE Trans. on Nuclear Science, vol. NS-28, No. 1, Feb. 1981—pp. 643-645.
IBM 7770 & 7772 Series Audio Response Unit Manual-IBM Systems Development Division—Research Triangle Park, North Carolina—pp. 1-29.
ADAS Systems Brochure—Butler National Corporation, Lenexa, Kansas, 1980.
Chatterbox Systems Brochure-Raco Manufacturing and Engineering Company-Emeryville, California—Aug. 5, 1981.
"Speech Synthesis Systems"-Brochure-Telesensory Systems, Inc., Palo Alto, California—Nov. 7, 1979.
Series III Speech Synthesizer Module Brochure—Telesensory Speech Systems, Palo Alto, California—Feb. 17, 1981.
"Cheaptalk" Brochure-Data Voice Corporation—Chicago, Ill.
TMS 5200 Voice Synthesizer Processor Instruction Module-Texas Instruments, Inc. pp. 1-26.
Texas Instruments Advertisement—Electronic News, Oct. 12, 1981.
Texas Instruments Advertisement—Electronic News, Mar. 2, 1981.
Elphick—"Talking Machines Aim for Versatility'-'—High Technology—pp. 41-48, Sep./Oct. 1980.
Cyberblast ® and Banshee ® Brochures—Cybersonic Division, C. A. Briggs Company, Glenside, Pa.—Aug. 1981 & Oct. 1981.

Primary Examiner—Joseph Ruggiero
Attorney, Agent, or Firm—Jim Zegeer

[57] ABSTRACT

An industrial control, communication and information system in which a speech synthesis device produces an analog speech waveform from digital data stored in a memory under control of a microprocessing unit and is interfaced to a source of control or speech selection signals by an interface system. The interface system uses the input switch closure to generate a signal to switch on power to the logic and other electronic circuits and protects the internal logic from harsh external electrical conditions such as transients and the like and eliminates false inputs and the effects of switch bounce.

13 Claims, 5 Drawing Figures

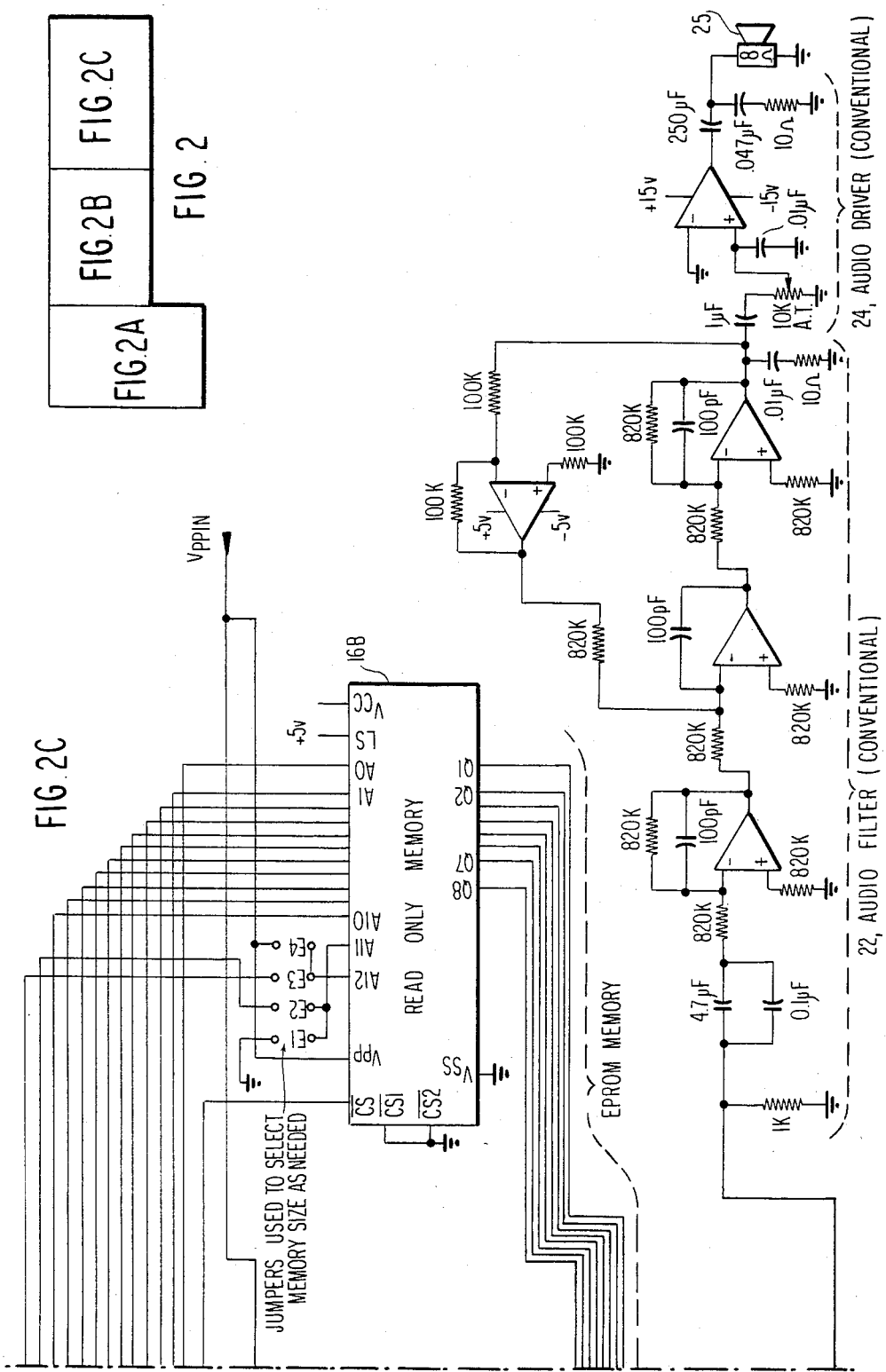

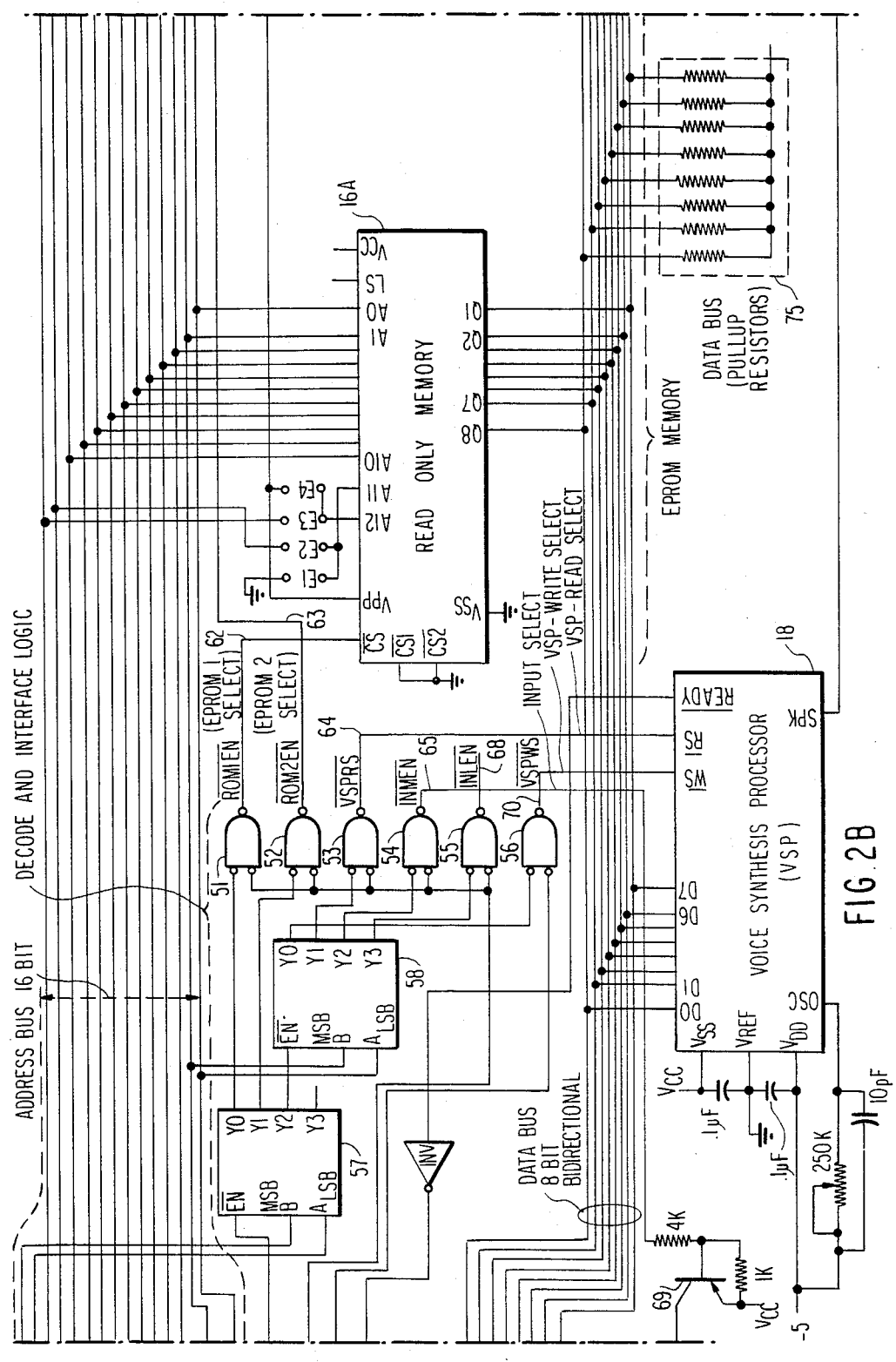

INDUSTRIAL CONTROL, COMMUNICATIONS AND INFORMATION SYSTEM

BACKGROUND AND BRIEF DESCRIPTION OF THE PRIOR ART

There are a number of industrial control, communication and information systems on the market which involve compact solid state audible signalling devices which provide distinctly different, selectable and programmable compelling alarm sounds which are produced to fit particular noise and ambient conditions in signalling requirements. A family of these devices is sold by the assignee hereof under the trademark "CYBERBLAST®". These devices can produce a plurality of distinctly different, selectable and programmable compelling alarm sounds which can be produced to fit particular ambient noise conditions and signalling requirements as encountered in the field. However, in some situations, such as the Three Mile Island nuclear accident, someone upon hearing an alarm became confused and took the wrong corrective action. Such a situation could possibly have been avoided had the alarm been verbal, such as giving express directions as to the corrective action to be taken e.g. "open safety valve one and close dump valve two".

In the past there have been a number of computer generated speech synthesizers such as the IBM 770 series audio response units which are capable of being connected to IBM system 360 computers via multiplexer channels to a signalling network. However, such units were extremely expensive, but with the advent of low cost speech synthesis processor units (VSP), verbal communication with a microprocessor computer based system has become readily available. There are a number of commercially available units in which programmable alarms are utilized such as produced by Butler National Corporation, Federal Sound and Signal Corporation, Telesensory Systems, Inc. and Data Voice Corporation of Chicago, Ill. Such units have been incorporated in computers and machines and in many industrial applications where a verbal output is preferred for warnings, alarms and instructions for corrective action.

The object of the present invention is to provide an improved industrial control communication and information system in which a voice synthesizer is utilized to provide verbal warnings, alarms and instruction for corrective action to be taken.

Another object of the invention is to provide an improved interface system which uses the input alarm condition switch closure to switch power onto the internal logic and other electronic circuits in the system and also protects the internal logic from harsh external electrical conditions such as transients and the like, and conditions the input signals to eliminate false inputs and the effects of switch bounce.

In a preferred embodiment of the invention switch closures denoting an alarm condition for which a voice alarm, warning or verbal instruction is to be produced, are coupled through an interface circuit which includes an optical couple for each signalling system to isolate the input switch closures and other harsh external electrical condition transients from affecting the internal logic conditions. The signals to the optical couples are conditioned to eliminate false inputs and switch bounce. Each such switch closure operates its own optical couple to provide an input signal of an alarm condition.

These input signals are polled or scanned by a central processing unit (CPU) in which all functions are memory mapped, that is, each device resides at a specific memory address which is decoded as a memory location. The central processing unit (CPU) performs all major system control functions such as decoding of the inputs, establishment of an input priority, the look-up of the data necessary to speak a selected phrase, control of commands to the voice synthesis processor (VSP) as required for its operation, management of the voice data flow for use by the VSP and polls the input state condition for change, such as discontinuing the speaking of an old phrase and initiating the speaking of a new phrase (e.g. an alarm of a higher priority). A bi-directional data bus (of 8 bits) is coupled between the CPU, the input buffer circuits, and the voice synthesis processor. In addition, an erasable programmable read only memory (ROM) is utilized for storing instructions used by the CPU in execution of the system function. In addition, the memory stores the program instruction sequence, the coded data for the speech synthesis and the look-up tables used by the CPU program to identify which phrase has been selected for voice synthesis, to locate the data in memory for the processing of a particular word, the amount of data required for that word and the length of the pause following the word. Each eight bit byte within the read only memories (ROM's) is mapped to a distinct memory address and can be accessed by the memory address bus in conjunction with the appropriate enabling signal from the decode logic.

The voice synthesis processor (VSP) receives voice data from the data bus byte by byte sequentially. When decoded with the appropriate command (also from the data bus), the VSP will interpret the data to determine the necessary pitch, amplitude and filtering characteristics required to reconstruct a string of digital codes corresponding to the audio waveform of the speech from which the data was initially derived. This string is then subjected to a digital to analog conversion, also within the VSP chip. The result is a stepped waveform analogous to the audio waveform of the recorded speech. This waveform is available at the output of the VSP. The VSP is mapped in the system at a specific memory location and is addressed by the decode logic as though it were a single memory word.

The decode and interface and logic section decodes the states of the address bus, and in conjunction with the control lines selects the source or destination of data on the data bus and provides the necessary strobe signals to implement the writing of data into the appropriate receiving device. All of these signals originate with the CPU which is the ultimate source of all synchronization and direction of data flow.

BRIEF DESCRIPTION OF THE DRAWINGS

The above and other objects, advantages and features of the invention will become more apparent when considered with the following specification and the accompanying drawings wherein.

Figure 1:
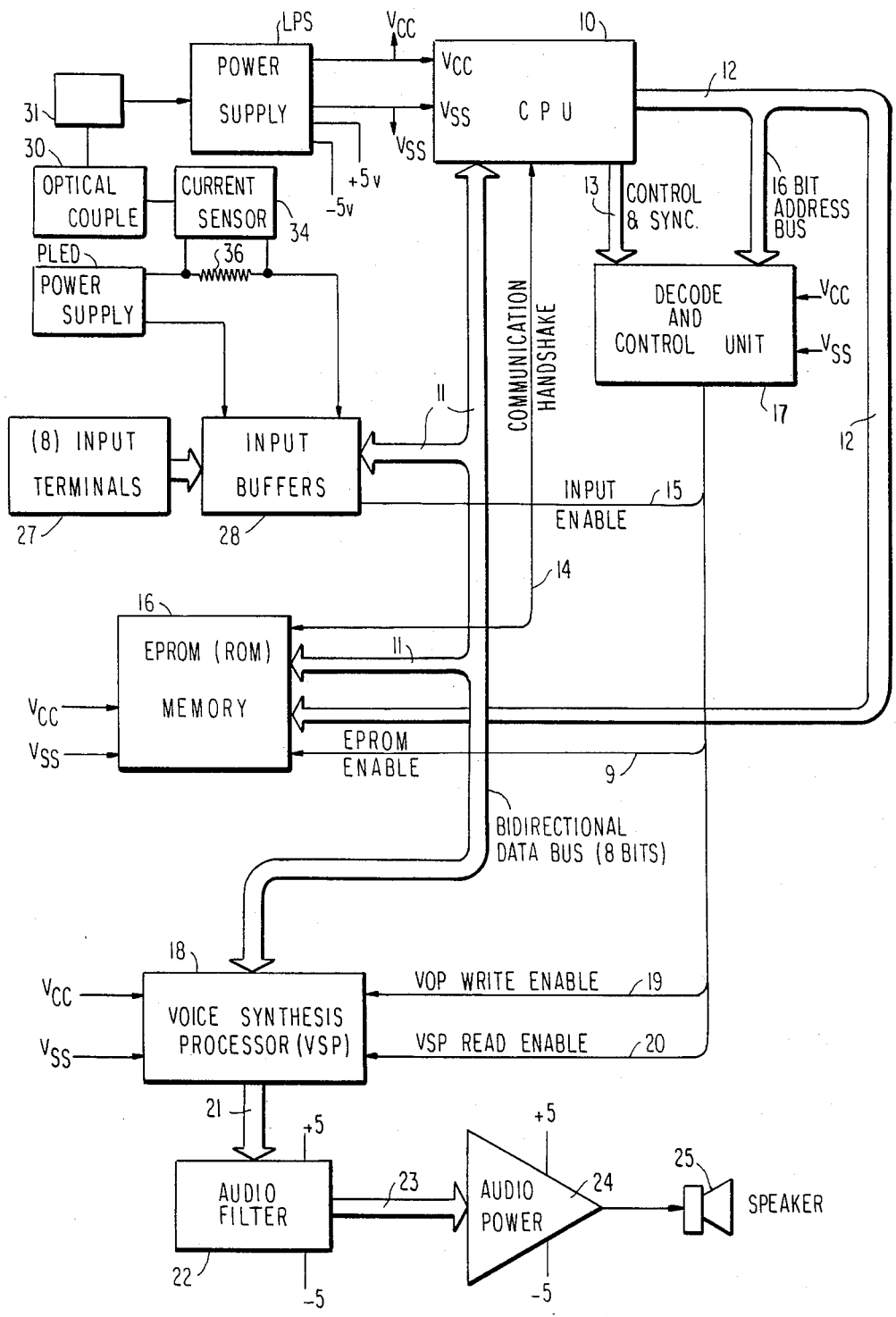
FIG. 1 is a blocked diagram of an industrial control and communication information system incorporating the invention.

With reference first to the block diagram of FIG. 1, the major elements of the system are illustrated and comprise the central processing unit 10 which, in this embodiment is a Texas Instruments TMS9995 which is a 16 bit microprocessor containing its own internal random access memory (RAM) for use as pointers, accumulators, counters, scratch pad memory, and work space register. The CPU communicates to the other system components on an eight bit bi-directional data bus 11 (which is internally multiplexed into 16 bit words—which is not critical to the present system concept. A detailed description of the internal block diagram, memories, work space register etc., is found in the Texas Instrument manual on this unit), and a 16 bit address bus 12, control and synchronizing lines 13 and a conventional communication handshake line 14 extending to the erasable programmable memory (EPROM) 16. Signals on the control and synchronizing lines 13 are supplied along with certain components from the 16 bit address bus 12 to decode and control logic 17. Decode and control logic circuit 17 is composed of conventional logic components which decodes the states of the address bus and, in conjunction with control lines 13, selects the source or destination of data on data bus 11 and provides the necessary strobe signals to implement the writing of data into the appropriate receiving device. All of these signals originate with the central processing unit which is the ultimate source of all synchronization and direction of data flow. It will be appreciated that while later herein there is provided a suggested programming for the CPU 10, this programming per se is conventional.

Signals on the bi-directional data bus 11 as well as on the 16 bit address bus 12 are supplied to the memory 16 along with an enable signal on line 9 from decode and control logic 17. In addition, a communication handshake between CPU 10 and the EPROM memory 16 is established via line 14.

The read only memory 16 is comprised of one or more EPROMS (depending on the amount of memory required by the particular application). These read only memories contain:

A. the program instruction sequence,
B. the coded data for speech synthesis and,
C. the look-up tables used by the program to identify which phrase has been selected for voice synthesis and to locate the data in memory for the processing of a particular word, the amount of data required for that word, and the length of the pause following the word. Each 8 bit byte within the EPROMS 16 is mapped to a distinct memory address and can be accessed by the memory address bus 12 in conjunction with the appropriate enabling signals from decode logic 17.

Signals from the memory are supplied on the bi-directional bus 11 to the voice synthesis processor (VSP) 18. In addition, the voice synthesis processor 18 receives VSP write enable signals and VSP read enable signals on lines 19 and 20 of decode and control logic unit 17. The voice synthesis processor 18 in this embodiment is a Texas Instrument TMS5220 although it will be appreciated that other voice synthesis processors may be used. This unit receives the voice data from the bi-directional data bus 11 byte by byte sequentially. When loaded with the appropriate command (also obtained from data bus 11), the VSP unit 18 will interpret the data to determine the necessary pitch, amplitude and filtering characteristics required to reconstruct a string of digital codes corresponding to the audio waveform of the speech from which the data was initially derived. This day may be purchased ready to be processed from Texas Instruments, Inc., the supplier of the VSP unit. This string of data is then subjected to a digital to analog conversion also within the VSP unit 18. The result is a stepped waveform analogous to the analog waveform of the recorded speech and this waveform is available at the output terminal 21 of the voice synthesis processor 18. The VSP 18 is mapped in the system at a specific memory location and it is addressed by the write enable line 19 and the VSP read enable lines 20 from the decode and control logic unit 17 as though it were a single memory word.

The waveform on the output lines 21 of the voice synthesis processor 18 is supplied to a conventional low pass active filter 22 the purpose of which is to eliminate the high frequency components of the VSP 18 output waveform. These components result from a sudden step change of amplitude which are characteristic of a digital to analog conversion. The filtered output from audio filter 22 is then supplied via line 23 to an audio power amplifier 24 which drives a speaker 25. The output from the voice synthesizer 18 through speaker 25 and the processing of such signals is done by conventional circuitry which is well known in the art.

Sample phrases which may be verbalized are as follows:

1. Tone . . . Tone, "CODE ONE" . . . Tone . . . Tone.
2. Tone . . . Tone, "CODE TWO" . . . Tone . . . Tone.
3. Tone . . . Tone, "CODE ETC" . . . Tone . . . Tone.
4. "Please Dial Extension Number Seven For Authorization".
5. Tone . . . "EMERGENCY" . . . Tone . . . Tone . . . "The Door Is Open, Depress Number Zero".
6. "Authorization Cancelled, Depress Emergency Code One. Call Extension Five Four Three".
7. "Please Enter, The Door Is Open".

The input interface unit 26 detects the presence of an input switch closure at any of eight available input terminals 27. It will be appreciated that more or less input terminals may be easily accomodated by the present system. These switch closures at the input terminals 27 are supplied to input buffers 28 which, as will be described more fully hereafter, protects the internal logic circuits from harsh external electrical conditions such as transients and the like and conditions the input signals to eliminate false inputs and switch bounce. In addition, closure of any one switch is sensed and used to switch on power to the CPU, decode and control logic voice synthesis and audio power output and other electronic circuits. This is done by sensing, by current sensor 34 an increase in current flow through resistor 36 due to closure of any switch and, via an optical couple 30 controlling a solid state switch 21 controls power to power supply LPS supplies the power to the central processing unit, the internal decode and control logic elements and the audio output power and speaker units.

The input interface 26 electrically isolates the input terminals from the internal logic circuit by means of optical isolators in the input buffer 28. A DC regulated power source PLED is used exclusively for the light emitting diode (LED) half of the optical isolators so there is no electrical connection between the exposed terminals and the sensitive internal logic circuitry of the system. Thus, the CPU 10 and all internal logic elements and circuit chips are protected from any harsh external transients.

Figure 2A:
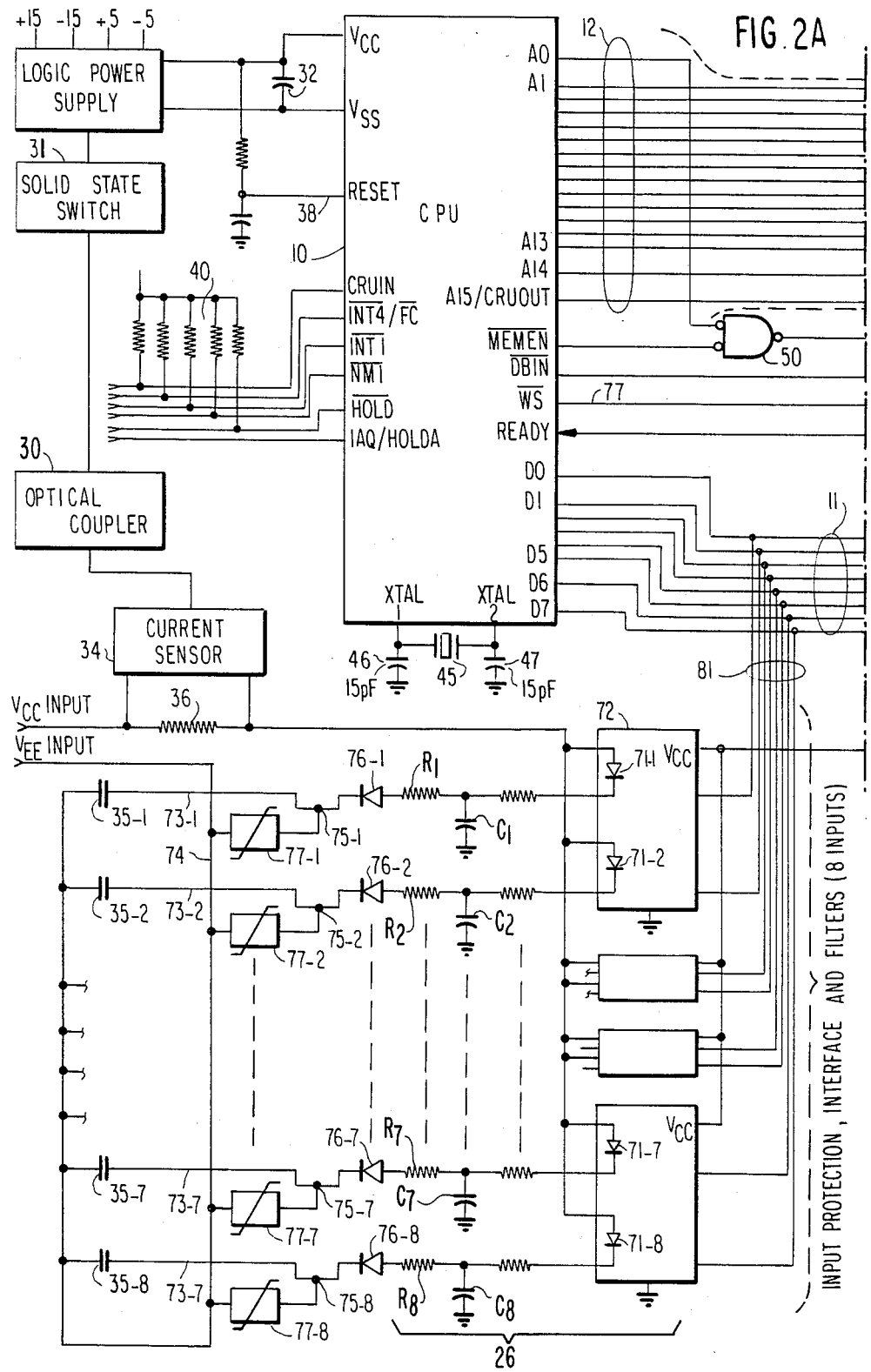
FIG. 2 is a map of FIGS. 2a, 2b and 2c and FIGS. 2a, 2b and 2c, taken together, constitute a schematic diagram of the industrial control and communication information system incorporating the invention.

Referring now to the schematic diagram of FIG. 2, central processing unit 10 receives power input on terminals 10-10 and 10-31 which have a decoupling capacitor 32 connected thereacross. The logic power supply PS is energized or enabled by a solid state switch 31 which is controlled by an optical couple 30. The optical couple 30 is connected to a current sensor 34. Current sensor 34 includes a very small resistor (under 10 ohm and typically about 1 ohm) which is connected in the supply line to the input terminals 27 and buffers 28. When any one of the input switches 35-1, 35-2, 35-3, . . . 35-8, is activated, a current will flow through current flow sensing resistor 36 which current flow is sensed by current sensor 34 to supply a signal to optical couple 30. Optical couple 30 has a light emitting diode (not shown) which emits an optical signal to a photo detector (not shown) in the optical couple 30 which detects the emitted light and produces a signal for operating a transistor switch 31 which controls the logic power supply LPS. Thus, the power to the CPU and all the internal logic circuits is normally not "on" until there is detected an alarm condition indicated by the actuation of any one of switches 35-1 . . . 36-8. It will be appreciated that more than one switch 35-1 . . . 35-8 may be closed during any given time and, as described later herein, the CPU will cause a scanning action of all of the inputs and, according to the priority determination previously established by the user will produce the desired voice alarm for the alarm condition having the higher priority. It will be appreciated that the CPU could also be programmed to sound all alarms in the order of their priority or with verbal instructions to the user of the order of priority.

The CPU 10 also has a reset input 38 which is operative whenever the logic power to the power supply is turned on so as to reset the entire unit for the new signals coming in. This reset signal is derived when the logic power supply LPS is turned on. Resistor 37R and capacitor 37C provide a 10 millisecond delay further assuring safety of the system.

In addition, the Texas Instruments TMS9995NL unit has several inputs shown in the lower left-hand-side of the unit to which have been connected pull-up resistors 40. The CPU 10 is a MOS unit in which the input resistors are used to disable those inputs. In other words, those inputs are not used.

CPU 10 requires an external clocking mechanism which in this case is supplied by a 4 or 8 megahertz clock constituted by a conventional crystal 45 and capacitors 46 and 47.

Output signals from the CPU 10 are supplied to the 16 bit address bus 12 which are labeled A0, A1, . . . A15/CRUOUT. These signals are supplied to the decode and control logic circuitry 17. The decode and control logic 17 is constituted by OR gates 50, 51, 52, 53, 54, 55 and 56 and a pair of two to four line decoder/multiplexers 58 and 59. (the logic diagram shows the gates as active low input NAND gates. Gates are functionally OR gates, a logical equivalent.)

Thus, the decode and interface logic 17 include means for decoding control signals from CPU 10 appearing on lines A0, A01, A02 and A14 and A15/CRUOUT terminals of CPU 10. These two decode/multiplex units 57 and 58 are initially enabled by the combination of the signal to two input OR gate 50, one input of which comes from the memory enable bus terminal 60 of CPU 10 and the other of which comes from the most significant bit A0 of CPU 10. These two inputs coupled to OR gate 50 provide an output which enables the decoder 57. Decoder 57 converts the two most significant next significant bits from CPU 10 and provides an output on its output terminals Y0, Y1, and Y2 (the fourth output not being used in this embodiment), with the output on terminal Y2 serving as the enable signal for the decode multiplexer 58. The two least most significant bits from CPU 10 on A14 and A15 outputs are supplied as the A and B inputs to decoder 58. The output signals on decoder/multiplexer 58 on terminals Y0, Y1, Y2, and Y3 are supplied as inputs to OR gates 51 . . . 56. The second input to OR gates 51-55 is derived from the "DATA BUS IN" terminal 60 of CPU 10. Thus, whenever a signal appears on the data bus in signal 60 of CPU 10, all of the OR gates 51 . . . 55 receive one input and the second inputs are received from the decode multiplexed logic circuit 57 and 58, respectively. Thus, when there are two inputs to the OR gate 51, there is an output on line 62 which selects EPROM read only memory 16A and when there is an output from OR gate 52, caused by inputs on the two input terminals to gate 52, EPROM read only memory 16B is selected by a signal on line 62. In like manner, when there are inputs to the two input terminals of OR gate 53, there is an output on read select line 64 which cause a reading at a selected location (of the voice synthesis processor 18). In like manner, when the two inputs on OR gate 54 are present, there is an output selection signal on input select line 65 which in this embodiment is utilized as an input signal to a transistor switch 69 which thus supplies the VCC supply voltage to all of the output sides of the optical couplers in the input buffers 28. The output 68 of OR gate 55 is not utilized and is provided for expansion purposes. Finally, OR gate 56 provides an output on input select line 70 when there are inputs on the input terminals thereto, one of which comes from the write enable output terminal 71 of CPU 10.

Thus, the CPU 10 controls all functions of the system including the reading for memory and the writing for memory of all aspects of the system. As noted earlier, all functions are memory mapped that is, each device resides at a specific memory address which is decoded as a memory location in CPU 10.

Each of the two read only memories 16A and 16B are shown as having a number of inputs which are not connected. Jumpers may be used to select the memory size as needed for the particular application. In fact, in some applications, the read only memory may be simply one read only memory unit or there may be more than the two shown. The data bus 11 has a plurality of pull-up resistors 75 connected thereto so as to provide isolation and buffering.

As noted earlier, the microprocessor unit or CPU 10 performs all major system control functions including the decoding of all of the alarm condition inputs, the establishment of the input priority, the look-up of data necessary to speak a selected phrase, control of commands to the voice synethsis processing unit as required for that unit's operation, the management of the voice data flow for the use by the voice synthesis processing unit 18 and, finally, it polls the input state condition for changes of (1) the old phrase which is to be discontinued, and (2) any new phrase to be initiated. As noted earlier, it can be programmed to speak all phrases where an alarm condition is activated and speak the priority, if desired.

THE INTERFACE CIRCUITS

The input interface electrically isolates the input terminals from the internal logic circuitry by means of optical isolators. A direct current regulated power source LPS is used exclusively for the light emitting diode (LED) half 71 of the optoisolators 72 so there is no electrical connection between the exposed terminals and the sensitive internal logic circuitry of the system. Metal oxide varistors (MOV) 77 are connected between each input line 73-1, 73-2 . . . 73-8 and the negative terminal 74 (label VEE input) of the input power supply 71 immediately upon their entrance into the unit. The purpose of metal oxide varistors 77-1 . . . 77-8 is to shunt any potentially damaging high voltage surges externally coupled to the input line 73-1 . . . 73-8. The connection 75 of 75-1, 75-2 . . . 75-8 of each metal oxide varistor 77 indicated as being a short connection. The metal oxide varistors 77 are capable of dissipating much of the energy of these surges, thus protecting the more vulnerable components further down the input path. A substantial diode rectifier 76-1, 76-2 . . . 76-8 is inserted in the circuit to protect the light emitting diodes 71-1, 71-2 . . . 71-7 and the optoisolator. The light emitting diodes 71-1 of the optoisolator can only withstand low reverse voltages and therefore are subject to damage and input lead be connected to a substantial voltage of reverse polarity.

As noted earlier, an important function of the input interface circuitry is to filter any false signals which might be interpreted by the system as a valid input actuation. False signals might result from inductively or capacitively coupled surges on the input lines 73-1 . . . 73-8 or from contact bounce of input switches 35-1 . . . 35-8. Such false signals are time buffered in two ways:

A. In the hardware, the RC network of resistor R2 and capacitor C1 represents a time delay and transfer of state change at the input terminals to that of the optoisolators output. This is in the order of 1 milisecond which is enough to cause the system to ignore the bounce of most contacts and most voltage transients.

B. Software: when the state of the eight inputs are sampled (as a single 8 bit byte) under software control, a tally is maintained in a memory location in the CPU 10 which is configured as a counter. The input byte's state is sampled several times. Should the state of the input byte change between samples, this counter (the counter in CPU) is reset and before an input byte is recognized as valid, several consecutive samples must be taken, each showing an identical set of input values. In other words, the computer in sampling the input terminals as a unit looks on it as a byte of information and it must look on it for several succeeding cycles of sampling or pollings in order to assure that the information is valid before an alarm is sounded.

An input scheme of this nature typically involves an additional problem as a result of the current required to actuate the light emitting diodes 71-1, 71-2 . . . 71-8. This current ranges from about 0.0016 amperes to about 0.020 amperes. Switch and relay contacts, unless made of or plated with nobel metals (usually gold) accumulate films of corrosion which act as electrical insulators. At higher voltages or currents, the mating surfaces of making contacts are heated through a combination of arcing and resistance. This heating has the affect of "burning" through any film on the contacts or even a surface melting and fusing resulting in true metal to metal contact and good electrical conductivity.

An additional feature of the input interface is that its configuration provides a brief high current surge upon the closure of the input contacts. After this surge, which is sufficient to clean or "wet" most contact surfaces, current is limited to that required to operate the light emitting diodes 71-1 . . . 71-8.

In the nonactive state, when the contact of switches 35-1, 35-2 . . . 35-8 are open, there is a small current flowing through the light emitting diode and resistor R2 (input) which charges capacitor C1 (input) to the input power supply voltage (which in this case is 12 volts) less the forward voltage drop of the light emitting diode (which is around 1 volt). When one or more of the contacts 35-1 . . . 35-8 is closed, its associated capacitor C1 is discharged through resistor R1, the protection rectifier 76-1 and the contacts of the switch which is closed. This results in a current surge measured at a peak of about 10 amperes. Capacitor C1 is then held in the discharged state until the contacts are again opened at which time it is permitted to charge again to become ready for the next closing.

Another function of the input interface is to provide a signal to turn on the system's logic circuits when an input is present. As described earlier, a small resistor, of about under 10 ohms (one ohm in the embodiment) is inserted in series circuit to the light emitting diodes. Hence, when any one (or more) of the light emitting diodes is turned on, there is a current increase which is sensed by a current sensor (which can be a solid state comparator) to activate another optoisolator 30. This optoisolator 38 provides a signal to turn on a transistor switch 31 which energizes the logic power supply LPS to the CPU 10 and other parts of the internal logic circuitry. This circuitry thus eliminates the unnecessary heating in the CPU, memories, etc. due to use of power when the device is not in use. By detecting the flow of current from the power source for the logic side of the optoisolators, the power to the rest of the system is controlled such that only the minimal current is required by the input interface need to be provided when the device is in the stand-by state.

As described in the preceding description, the instruction sequence for the system's operation resides in the read only memory section of the system. Upon actuation of an input alarm condition switch, the power to the logic circuits is turned on. On application of power as described above, the CPU 10 reads the instructions stored in the EPROMS 16A and 16B by asserting the appropriate addresses on the address bus 12 and the EPROM select control lines 62 and 63, respectively. The EPROMS 16A and 16B respond by outputting the stored instructions on data bus 11 which data is received by the CPU 10 in its input lines D0, D01, . . . D07 which involves the input interface or the VSP, asserts the appropriate addresses from its map memory and selects signals in a similar manner and either drives the data bus 11 in the case of passing data to the voice synthesis processor 18 or reads the value on the data bus in the case of reading the value of the input byte on the output lines 81 of the optoisolator 72.

As indicated earlier, the system implementation is as described above. The microprocessing unit or CPU 10 has its software divided into three main blocks or modules:

| CPU MEMORY LOCATION WORKSPACE REGISTER IN THE TMS995 CPU ARE DESIGNATED AS R0, R1, R2...R10 | |
|---|---|
| | A. SPEAK PHRASE |
| | (1) Priority polled to determine phrase to be spoken (see Heading C below). R1 contains code of selected phrase |
| | (2) Selected phrase number is copied in R2 to be saved for future comparison. |
| | (3) Displacement of selected phrase data (see Heading C below, for determination of selected phrase), is moved to R4. |
| R4 to be referred to as data table pointer, or DT, henceforth | (4) Address of start of look-up table $334_{16}$ is added to displacement value placed in R4 in A.3 above. This value is the starting address of the block of data in the look-up table which will be used in accessing data for the speaking of the phrase selected by the input switch. |
| R5 to be referred to as phrase length counter, or PLC, henceforth | (5) The contents of DT (R4) are copied in R5. DT (R4) is automatically incremented to point to the next piece of data in the look-up table. The memory location to which R5 now points contains a number representing the number of words to be spoken in the selected phrase. |
| | (6) The selected word is now processed and spoken (see Heading B above for description of this function) under control of sub-program referred to as "Speak One (Word). |
| | (7) Sub-program "Speak One" returns control, but having polled the condition of the inputs before so doing, it has recorded in R3 whether or not the phrase currently being processed is still the highest priority selected by the inputs |
| |     (a) If priority has changed, control reverts to step A.2 above for processing of new priority. |
| R6 to be referred to as Pause Counter, or PC, henceforth. |     (b) If priority has not changed DT (R4) is copied in R6 and automatically incremented. |
| | (8) Delay counter R7 is loaded with a constant value ($300_{16}$). |
| | (9) The number in R7 is decremented, one instruction per count, implementing a time delay equal to the execution times of the involved instructions multiplied by the starting value in R7. |
| | (10) Input priority condition is checked as in Heading A.7 above |
| |     (a) If priority has changed, control reverts to step A.2 above for processing of new priority, |

-continued

| CPU MEMORY LOCATION WORKSPACE REGISTER IN THE TMS995 CPU ARE DESIGNATED AS R0, R1, R2...R10 | |
|---|---|
| |     (b) If priority has not changed PC (R6) is decremented. |
| | (11) Steps 9 through 10b are repeated until the value in R7 = 0. |
| | (12) PLC (R5) is decremented indicating the completion of the processing of one word and its associated phrase. |
| |     (a) If PLC (R5)>0, more words remain in phrase and control reverts to Heading A.6 above with PLC (R5) pointing to start of data for next word |
| |     (b) If PLC (R5)=0 phrase is complete and control loops back to start and phrase is repeated. |
| | B. SPEAK ONE WORD |
| | (1) Reset CTR (R15) is set to (9). |
| | (2) One byte of all ones is written into VSP via its data bus. |
| | (3) Reset CTR (R15) is decremented. |
| | (4) Steps 1-3 above are repeated until (R9)=0, meaning that 9 bytes have been written. This is necessary to be guaranteed that the VSP is totally reset. |
| | (5) VSP status register is read. TS (Talk Status) true means speech is being processed. Program will wait until TS is no longer true, meaning that complete reset has been accomplished. |
| R8 to be referred to henceforth as Speech Data Pointer of SDP. | (6) The contents of DT (R4) are copied into R8. DT (R4) is automatically incremented. This leaves R8 pointing to the location in memory containing the first byte of speech data for the selected word. |
| R9 to be referred to henceforth as Word Length Register or WLR. | (7) The contents of DT (R4) are copied into R9. Dt (R4) is automatically incremented. This leaves R9 containing the number of bytes of speech data necessary for the speaking of the selected word. |
| | (8) The speak external command is written into the VSP. |
| | (9) Byte counter (R10) is set to 8. |
| | (10) Contents of memory location pointed to by SDP (R8) are written to VSP. |
| | (11) SDP (R8) is automatically incremented to point to the next byte of speech data. |
| | (12) WLR (R9) is decremented. |
| | (13) Byte counter is decremented. |
| | (14) Steps 10-13 are repeated until value contained in byte counter = meaning 8 bytes of speech data have been written |

| CPU MEMORY LOCATION WORKSPACE REGISTER IN THE TMS995 CPU ARE DESIGNATED AS R0, R1, R2...R10 |
|---|
| to VSP.
(15) Input priority condition is checked as in Heading A.7 above
    (a) If priority has changed, VSP status register is checked to see if BL (Buffer Low) is active meaning the VSP input buffer has space to receive a reset data byte needed to cleanly terminate speech generation. If BL is not active, the program waits until it is, and then jumps ahead to step B.8 leaving the code of the newly selected phrase in R1
    (b) If priority has not changed, BL condition is checked as in Step B.15a above, if BL is not active program jumps back to Step B.15 and continues in a loop until BL is found to be true.
(16) If the contents of WLR (R9) is greater than or equal to 8, (meaning that 8 or more bytes of speech data remain to be processed in the selected word) control reverts to Step B.9 above to write another 8 bytes of speech data to the VSP.
(17) If the contents of WLR (R9) are less than 8 but greater than zero, control reverts to step B.10 above to load one more byte of speech data into the VSP.
(18) One byte of all ones, followed by one byte of all zeros are written to the VSP to reset the VSP and terminate speech synthesis.
(19) Input priority is checked as in step A.7 above leaving any new selection priority code in R1.
(20) Control returns to step A.7 above.
C. PRIORITY POLL SUBROUTINE
(1) R3 is cleared.
(2) Input code written from inputs into R0. (Inputs are memory mapped onto data bus).
(3) R1 is set to the value $8000_{16}$ (1000 0000 0000 $0000_2$)
(4) R0 (input code) is compared to contents of R1.
(5) If value of input word is less than that in R1, the contents of R1 are shifted right, one bit. This has established that no bit in the input word of higher significance than the set bit in R1 is active.
    (a) R13 is incremented in order to count arithmetically the number of times it is necessary to shift the test bit in R1 before it corresponds to an active bit in the input word.
    (b) Program jumps back to step C.4.
(6) If value of input word is greater than or equal to that in RL, contents of R1 are compared to contents of R2 (saved in step A.2) from previous processing of input word).
(7) If contents of R1 equal contents of R2, no change of input priority has occurred and control returns to calling program.
(8) If contents of R1 = contents of R2, a change in input priority has occurred, which is recorded by setting (R3)=$000_{16}$
(9) Control is then returned to calling program. |

While I have described and illustrated one specific embodiment of my invention, it will be clear that variations of the details of construction which are specifically illustrated may be resorted to without departing from the true spirit and scope of the invention as defined in the appended claims.

What is claimed is:

1. In an industrial communication and information control system for converting alarm condition signals at an industrial facility to a verbal alarm corresponding to said condition, including means for producing said alarm condition signals, a central data processing unit, memory means coupled to said central data processing unit, voice synthesis processor means controlled by said central data processing unit for producing audio voice signals and speaker means for converting said audio voice signals to an audible sound alarm, and power supply means for supplying electrical energy to the central data processing unit, said memory means and voice synthesis processor, the improvement comprising
    means for sensing said alarm condition signal and producing a power supply control signal,
    electronic switch means coupled to said power supply means for controlling energy from said power supply means to said central data processing unit, said memory means and said voice synthesiser processor, and
    means coupling said power supply control signal to said electronic switch means only upon the presence of a sensed alarm condition signal.

2. The invention defined in claim 1 wherein said means coupling said power supply control signal to said electronic switch is an optical couple.

3. The invention defined in claim 1 wherein said audio voice signal producing means and said speaker are connected to receive electrical energy from said power supply.

4. The invention defined in claim 1 including a further power supply independent of the first said power supply for supplying electrical energy to the means for producing said alarm condition signals, and said means for sensing includes a resistor in circuit with a plurality of said means for producing alarm condition signals and said further power supply.

5. In an industrial communication and information control system having electrical switch means for producing a plurality of electrical signals corresponding to a plurality of alarm conditions in an industrial facility, a central data processing unit for scanning said means for producing a plurality of signals, the improvement comprising, means for sensing the presence of signals corresponding to any one of said alarm conditions, and producing an activating signal, means coupling said activating signal to said central data processing unit for activating same, each said switch means being connected to an optical couple having a light emitting element and a light detecting element, said activating signal being constituted by current flow to one of said light emitting elements, and all of said light detecting elements being simultaneously electrically energized by a common signal from said central data processing unit.

6. The invention defined in claim 5 including a voice synthesis processor means controlled by said central data processor unit, and speaker means controlled by said voice synthesis processor unit.

7. The invention defined in claim 5 including means associated with each said electrical switch means for storing electrical energy, and means for discharging the stored electrical energy on closure of an associated electrical switch means.

8. An industrial communication and alarm information control system having a plurality of electrical switch means for producing a respective plurality of electrical signals corresponding to a plurality of alarm conditions in an industrial facility, a central data processing unit, memory means, a voice synthesis processor unit, speaker means coupled to said voice synthesis unit for producing audible voice alarms related to the sensed alarm condition and a bi-directional data bus interconnecting all of said units, an optical couple connecting each said electrical switch, respectively, each said optical couple including a light emitting element coupled to a source of electrical energy through its associated switch, and a light detecting element for producing electrical signals on said bi-directional bus.

9. The invention defined in claim 8 wherein each said light detecting element is simultaneously energized by a signal from said central data processing unit.

10. The invention defined in claim 8 including an electrical energy storage means coupled to each said electrical switch; respectively, and means for discharging the stored energy in a surge through said switch upon closure of the switch control elements.

11. The invention defined in claim 8 wherein said central data processing unit is programmed to scan said optical couples a plurality of times before producing signals on said bi-directional data bus for controlling said voice synthesis processor unit and said speaker means to sound a selected alarm condition.

12. The invention defined in claim 8 wherein said means coupled to said central processing unit is a read only memory for storing:

A. the program instruction sequence for said central processing unit,

B. the coded speech synthesis data, and

C. the look-up tables used by the program to identify which phrase has been selected for voice synthesis to locate the data in memory for the processing of a particular word, the amount of data required for that word and the length of the pause following the word.

13. The invention defined in claim 12 including decode and logic control means connected between said central data processing unit, said memory, said voice synthesis processor unit and said light detecting elements to select the source or destination of data on said bi-directional bus and to implement the writing of data into the appropriate receiving device.

* * * * *